United States Patent [19]

Inoue

[11] Patent Number: 5,594,716
[45] Date of Patent: *Jan. 14, 1997

[54] OPTICAL DISK SUBSTRATE AND OPTICAL DISK EMPLOYING SAID OPTICAL DISK SUBSTRATE

[75] Inventor: Kazuo Inoue, Osaka, Japan

[73] Assignee: Matsushita Electric Industrial Co., Ltd., Osaka-fu, Japan

[*] Notice: The term of this patent shall not extend beyond the expiration date of Pat. No. 5,477,526.

[21] Appl. No.: 494,178

[22] Filed: Jun. 23, 1995

Related U.S. Application Data

[63] Continuation of Ser. No. 137,985, Oct. 19, 1993, Pat. No. 5,477,526.

[30] Foreign Application Priority Data

Mar. 10, 1993 [JP] Japan .................................. 5-048836

[51] Int. Cl.⁶ .................................. G11B 7/00; G11B 7/24
[52] U.S. Cl. .................................. 369/275.4; 369/275.3
[58] Field of Search .................................. 369/275.1, 275.3, 369/275.4, 94, 109, 272

[56] References Cited

U.S. PATENT DOCUMENTS

| | | | |
|---|---|---|---|
| 4,423,502 | 12/1983 | Dil | 369/275.4 |
| 5,383,176 | 1/1995 | Inui | 369/275.4 |
| 5,422,874 | 6/1995 | Birukawa | 369/275.2 |
| 5,477,526 | 12/1995 | Inoue | 369/275.4 |

FOREIGN PATENT DOCUMENTS

2-156423  6/1990  Japan .................................. 369/275.4

*Primary Examiner*—David C. Nelms
*Assistant Examiner*—Son Mai
*Attorney, Agent, or Firm*—Wenderoth, Lind & Ponack

[57] ABSTRACT

An optical disk substrate which includes a plurality of sectors, tracks alternately formed into lands and grooves in a direction intersecting at right angles with a tracing direction during recording or reproducing of information, a first pit row having address information and formed at a specific position of the track of a predetermined one land or groove, and a second pit row having address information and formed in a different track neighboring the track formed with the first pit row in the tracing direction, and formed at a position deviated longer than a length of the pit row from the specific position. By the above arrangement, the address information can be read without interference, with reduction of waiting time for reading.

4 Claims, 7 Drawing Sheets

A portion
B portion

OPTICAL DISK SUBSTRATE AND OPTICAL DISK EMPLOYING SAID OPTICAL DISK SUBSTRATE

This is a Rule 60 continuation of Ser. No. 08/137,985, filed Oct. 19, 1993 U.S. Pat. No. 5,477,526.

BACKGROUND OF THE INVENTION

1. Field of the Invention

The present invention generally relates to an optical disk used substrate and an optical disk as a large capacity recording medium, and more particularly, to an optical disk substrate and an optical disk capable of being recorded at high density, and accessed from opposite sides or both faces.

2. Description of the Prior Art

Figure 10:
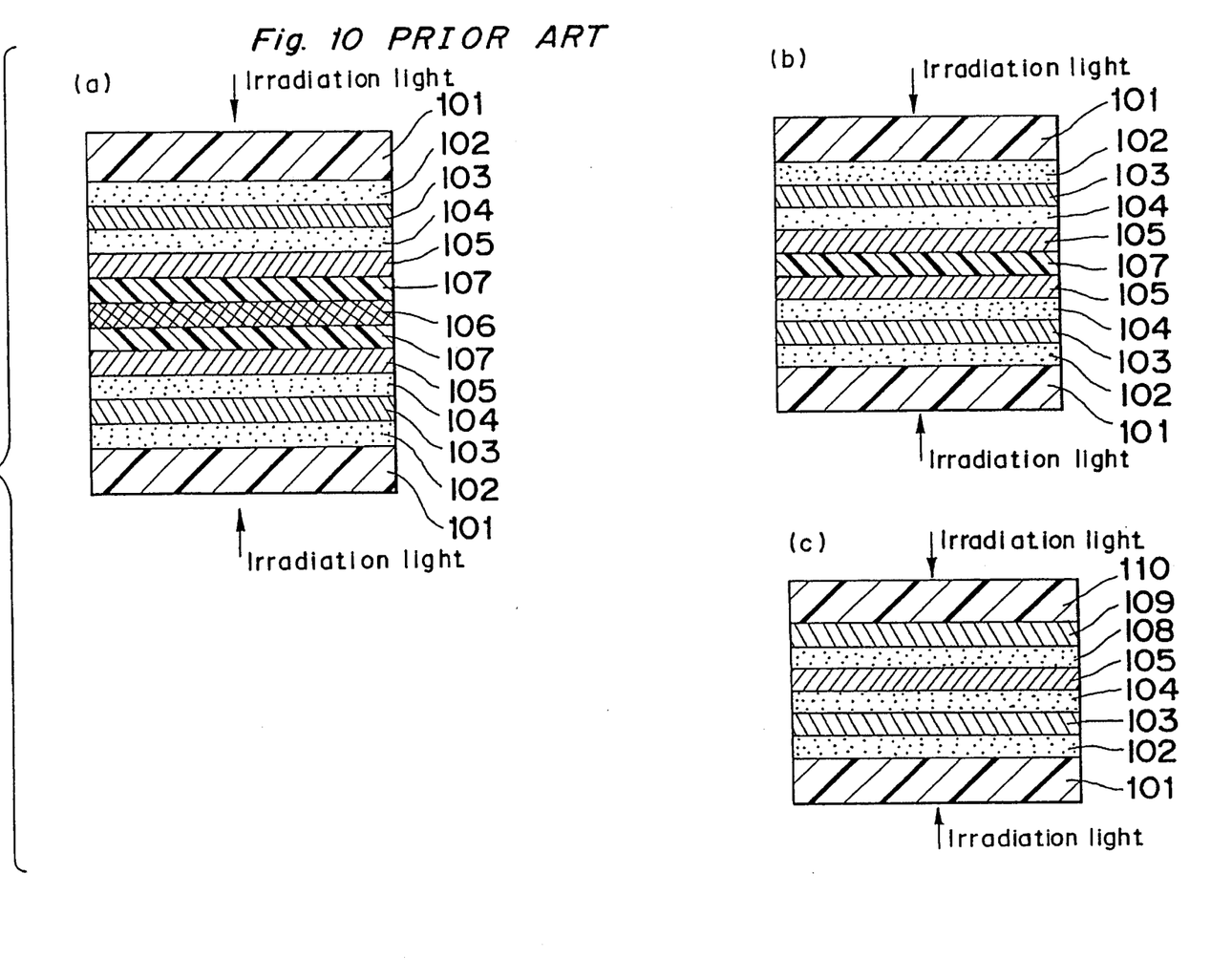
FIGS. 10(a), 10(b) and 10(c) are cross-sections showing three kinds of conventional optical disks (already referred to)

Conventionally, the construction of an optical disk capable of being accessed from opposite sides or faces has been disclosed, for example, in Japanese Laid-Open Patent Publication Tokkaisho No. 60-57553, and cross sections thereof are shown in FIGS. 10(a), 10(b) and 10(c).

In FIGS. 10(a) and 10(b), the known optical disk includes substrates 101 each made of a resin which transmits an irradiation beam, an optical subbing layer 102 provided on said substrate 101 for imparting a surface smoothness or forming tracks, etc. thereon, and an active layer 103, a spacer layer 104 and a reflective layer 105 further laminated sequentially on said optical subbing layer 102 as shown.

In FIG. 10(a), the substrate 101 after the lamination as described above are bonded to each other through adhesive resin layers 107, with a mechanical lining 106 of an aluminum plate or the like being held therebetween. Meanwhile, in the arrangement of FIG. 10(b), the substrates 101 after the lamination as stated above are directly bonded to each other through the adhesive resin layer 107. In the construction of FIG. 10(c), after laminating the optical subbing layer 102, active layer 103, spacer layer 104, and reflective layer 105 sequentially on the substrate 101, another spacer layer 108 and an active layer 109 are further laminated to achieve an optically mirror symmetrical relation at the reflective layer 105, with an overcoat layer 110 being further provided as illustrated.

Figure 11:
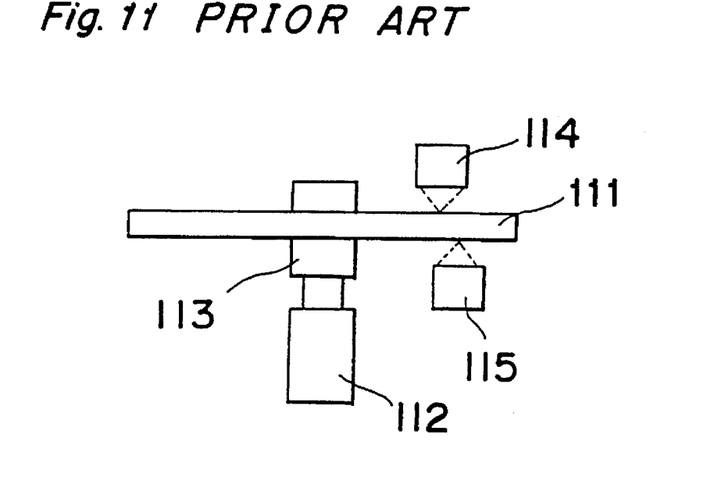
FIG. 11 is a schematic side elevational view showing a conventional optical disk device of both side access type (already referred to)

FIG. 11 is a schematic side elevational diagram showing an optical disk device of a dual side access type, in which a double-sided disk 111 has a recording capacity two times that of a single-sided disk, and is capable of being simultaneously accessed on front and reverse faces by the optical disk device. More specifically, the double-sided disk 111 is mounted on a rotary shaft 113 of a motor 112 for rotation in a predetermined direction, and by read/write heads 114 and 115 provided at the front and reverse face sides of the double-sided disk 111, reading and writing of information are effected with respect to each face of the disk 111.

Figure 12:
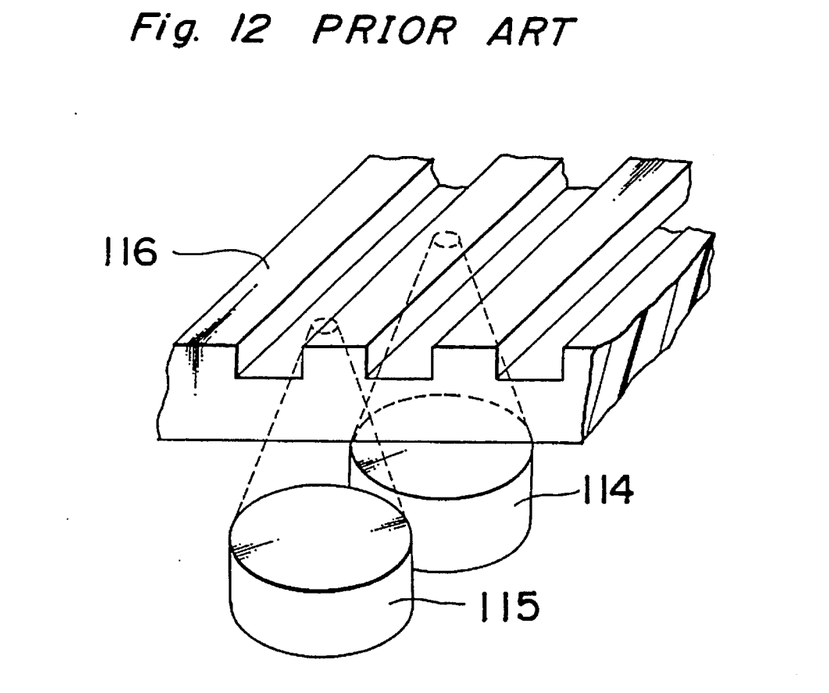
FIG. 12 is a fragmentary perspective diagram for explaining an optical disk device for simultaneously accessing a conventional single-sided disk having lands and grooves (already referred to).

Moreover, as one of the means for improving a recording density of an optical disk, there has conventionally been proposed a method for forming neighboring tracks alternately into lands and grooves as shown in FIG. 12, in which a single-sided disk 116 has its tracks formed by the lands and grooves. For reading and writing information, as observed from an incident side of light, the read/write head 114 accesses the track for the groove, while the read/write head 115 accesses the track for the land, by which arrangement, the recording capacity may be doubled as compared with the case where only the lands or grooves are utilized for the track.

In Japanese Laid-Open Patent Publication Tokkaihei No. 2-189743, there is disclosed a system in which, in a dual sided access type optical disk, with respect to the neighboring tracks formed with the lands and grooves as in the single-sided disk 116 in FIG. 12, the track for the land is accessed from the front face, while the track for the groove is accessed from the reverse face.

As shown in FIGS. 10(a) and 10(b), in the conventional double-sided disk, since the information of the track and address is provided in the substrate 101 or the optical subbing layer 102, such information of the track and address is completely independent on the front and reverse faces. However, due to the manufacturing process to bond two single-sided disks to each other after preparation thereof, many man-hours are required for the manufacture, thus resulting in cost increase. Meanwhile, when the optical disk as shown in FIG. 10(c) is adopted, there is an advantage in that the labor time is reduced for cost reduction. On the other hand, in the type where both faces of the optical disk are simultaneously accessed, since rotating directions of the optical disk are opposite in the front and reverse faces, if the optical disk has the constructions as explained with reference to FIGS. 10(a) and 10(b), it becomes necessary to provide substrate or subbing layers of different formats. In order to solve such a problem, there has been proposed, for example, in Japanese Laid-Open Patent Publication Tokkaihei No. 4-64933, an arrangement in which two address rows are provided in pairs so that one address may be read in direction opposite to the scanning direction, but in this case, the length of the address becomes undesirably longer.

In the case where the substrate for the conventional single-sided disk is to be accessed from both sides, heat interference occurs between the tracks on the front and reverse faces, if the same tracks are used for the front and reverse faces. For example, in the optical disk of a rewritable type, there is a problem that a recording mark disappears.

Such heat interference will not take place when different tracks are employed on the front and reverse faces, but conventionally, since pits for the address information are located at approximately the same position, there has also been in that the information of the address is not easily read or tracking becomes unstable due to interference with pits on the neighboring tracks.

Moreover, in the conventional practice, one track is divided into a plurality of sectors for allocation of the addresses, and in this case, since the neighboring tracks are located at approximately the same position, a waiting time for at least one sector is required for the change-over of data on the front and reverse faces.

Even in the case of the one side access, there has also been an inconvenience in the conventional arrangement in that, in the optical disk utilizing both of lands and grooves for the tracks, since the pits for the address information are located at approximately the same position, interference occurs with respect to the pits of the neighboring tracks, thus making it difficult to read the information of the address or making the tracking unstable. Similarly, the problem that the waiting time at least for one sector is required for the change-over of the data between the lands and grooves, is also involved in this case.

SUMMARY OF THE INVENTION

Accordingly, an essential object of the present invention is to provide an optical disk substrate and an optical disk in which a processing circuit for address reading is simplified, without any interference during reading of the address information, while waiting time for reading is reduced, and change-over at high speeds is made possible.

Another object of the present invention is to provide an optical disk substrate and an optical disk of the above described type which are simple in construction and accurate in functioning, and can be readily manufactured on a large scale at a low cost.

In accomplishing these and other object of the present invention, according to one aspect to the present invention, there is provided an optical disk substrate which includes a plurality of sectors, tracks alternately formed into lands and grooves in a direction intersecting at right angles with a tracing direction during recording or reproducing of information, a first pit row having address information and formed at a specific position of the track of a predetermined one land or groove, and a second pit row having address information and formed in a different track neighboring said track formed with said first pit row in the tracing direction, and formed at a position which is spaced apart by a distance which is longer than length of the pit row from said specific position.

In the above optical disk substrate, correspondence of the address information to the concave and convex portions of said pit row is inverted between said neighboring tracks.

In another aspect of the present invention, the optical disk substrate including a plurality of sectors, tracks alternately formed into lands and grooves in a direction intersecting at right angles with a tracing direction during recording or reproducing of information, a first pit row having address information and formed at a specific position of the track of a predetermined one land or groove, and a second pit row having address information and formed in a different track neighboring said track formed with said first pit row in the tracing direction, and formed at a position which is spaced apart by a distance which is longer than a length of the pit row from said specific position, and at least an active layer provided on said optical disk substrate.

In a further aspect of the present invention, the optical disk includes an optical disk substrate including a plurality of sectors, tracks alternately formed into lands and grooves in a direction intersecting at right angles with a tracing direction during recording or reproducing of information, a first pit row having address information and formed at a specific position of the track of a predetermined one land or groove, and a second pit row having address information and formed in a different track neighboring said track formed with said first pit row in the tracing direction, and formed at a position which is spaced apart by a distance which is longer than a length of the pit row from said specific position, with correspondence of the address information to the concave and convex portions of said pit rows being inverted between said neighboring tracks, and at least two active layers and a reflective layer held between said active layers which are provided on said optical disc substrate.

In the arrangement according to the present invention as described above, the tracks are alternately formed into lands and grooves in a direction intersecting at right angles with a tracing direction during recording or reproducing of information, and the first pit row having address information is formed at a specific position of the track of a predetermined one land or groove, and the second pit row having address information formed in a different track neighboring said track formed with said first pit row in the tracing direction, is formed at a position which is spaced from the specific position, and therefore, there is no interference during the reading of the address information, with less waiting time for the reading.

Moreover, since the correspondence of the address information to the concave portions and the convex portions is inverted between the neighboring tracks, the formats of the address information respectively read from the opposite sides of the disk are the same, and consequently, there is an advantage in that the processing circuit for the address information becomes simple.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Referring now to the drawings, the present invention will be explained first with respect to an embodiment of a double-sided optical disk substrate which is to be accessed from front and reverse faces of the disk.

In FIGS. 1(a), 1(b) and 1(c), there is shown an optical disk substrate according to a first embodiment of the present invention. On the substrate 1, substantially concentric tracks 2 for servo use are formed alternately by lands and grooves. In the tracks 2, addresses 3 written with address information of the track 2 and sector are formed in a pit row. The optical disk substrate 1 has such addresses 3 both on the lands and grooves. FIG. 1(c) shows the state of the addresses provided on the lands (at an A portion in FIG. 1(b)) and the state of the addresses provided on the grooves (at a B portion in FIG. 1(b)). At these A and B portions, correspondence of the concave portions and convex portions of the pits to the information is shown as being inverted. Directions at the starting and ending of the information of the pits row are the same both in the A and B portions. For example, in the case where the light beam is moved from the left to right in FIG. 1(c), the left side represents the start of the information, and the right side denotes the end of the information.

By the above arrangement, for example, in the case where irradiation light from a mirror face side of the substrate 1 is projected onto the track having the address of A (i.e., the land side), and that from the opposite side is projected onto the track having the address of B (i.e., the groove side), since the address information has the same configuration with respect to the irradiation light, only one reading circuit for the address information may be sufficient for the purpose. In this case, it may be so modified that the irradiation light from the mirror face side of the substrate 1 is projected onto the track having the address for B, and that from the opposite side is projected onto the track having the address for A.

Meanwhile, in FIG. 1(b), the address 3 provided the groove are disposed through deviation in the circumferential direction. This arrangement is necessary, because if the addresses 3 are present in the positions which coincide in the circumferential direction in the tracks for the lands and grooves, for example, in the case where condensed light spot is directed onto the position of the address 3 in the track for the land, the end portion of the condensed light spot is also projected onto the position of the address 3 in the track for the groove so as to give rise to the interference of the light, thus making it impossible to read the address information correctly.

Subsequently, control performance for the tracking will be investigated. By way of example, there will be considered a case where a substrate in which one track includes 18 sectors is rotated at 1,800 r.p.m. The control frequency band width for the tracking is set to be below 3 KHz. When the addresses are arranged at equal intervals on the track by the number of sectors, the frequency for detecting the address is 540 Hz per one track, and circularity and eccentricity of the track (an amount of deviation between a rotational center of the disk and the center of the track) can be fully followed thereby.

Here, the address pit row acts as disturbance of signals in the case where tracking is effected. Generally, the control becomes difficult if the disturbance takes place for a time period longer than four times the control frequency band-width of the tracking, and the time period will be 83 µs in this example. Therefore, if the length of the address pit row is selected to be 50 µs in the length of signal, there will be no problem in the tracking control performance.

Then, it is necessary to identify the track provided on the substrate during the tracking, and in the present invention, it is required to distinguish the land and groove in a manner as described hereinbelow.

Figure 2:
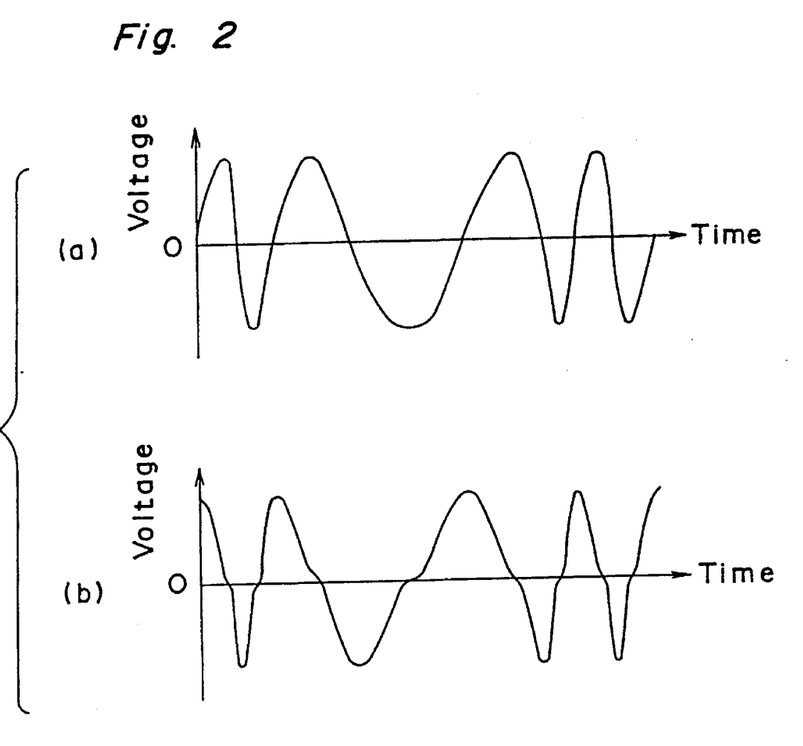
FIG. 2(a) is a graphical diagram showing a tracking error signal according to a first embodiment of the present invention.
FIG. 2(b) is also a graphical diagram showing a single or one time differential signal of the above.

Due to the deviation between the track center and the rotational center when the tracking control is not effected, the tracking error signal has a wave form as shown, for example, in FIG. 2(a), which represents the tracking error signal equivalent to one round of the substrate. For example, in the tracking control based on a push-pull method, a difference signal of returning light from the substrate is set to be the tracking error signal through employment of a binary detector. The state that the tracking error signal becomes positive or negative shows that the center of the beam spot has been deviated from the center of the track for the land or groove formed in the substrate. Here, on the assumption that the position of a zero crossing point rising at the right represents the center of the track for the groove, the position of a zero crossing point lowering at the right shows the center of the track for the land. Accordingly, in the case where the track for the groove is accessed by observing the substrate from the incident side of the light, it may be so processed to detect the zero crossing point rising at the right of the tracking error signal so as to displace a pick-up to said position for holding control. For such detection and holding of the zero crossing point, processing may be so effected that the maximum value of a single differential signal of the tracking error signal is detected, and this single differential signal of the tracking error signal is controlled to be of the largest value at all times. FIG. 2(b) shows the single differential signal of the tracking error signal. Similar control may be effected in the case where the land portion is to be accessed by observing the substrate from the incident side of light, with only the polarity being reversed.

According to the present invention, the lands and grooves are utilized as the tracks, and the amount of deviation in the positions of the tracks for the lands and grooves is set to be of a predetermined value in the range of ¼ sector to ¾ sector. This range is considered to be suitable for reducing the waiting time for the change-over of the data between the lands and grooves, and the most preferable deviation amount is ½ sector. Generally, from the viewpoint of simplification of the mechanical system, the two read/write heads disposed at the front and reverse sides of the optical disk are designed to be displaced in the same radial direction. Thus, in the case where the data on the front and reverse sides are accessed in association with each other, the waiting time required for the change-over of the data at the front and reverse sides becomes the time in which the beam is displaced in the deviation amount of the sector. Moreover, in the case where the access is to be changed over between the tracks provided at the front and reverse sides, the deviation amount in the position of the address should be made longer than the length of the address. This is necessary since the address of a next track is read after the address of the previous track has been read. The reading of the address is processed in the real time, and consequently, data processing at high speed becomes possible.

Figure 3:
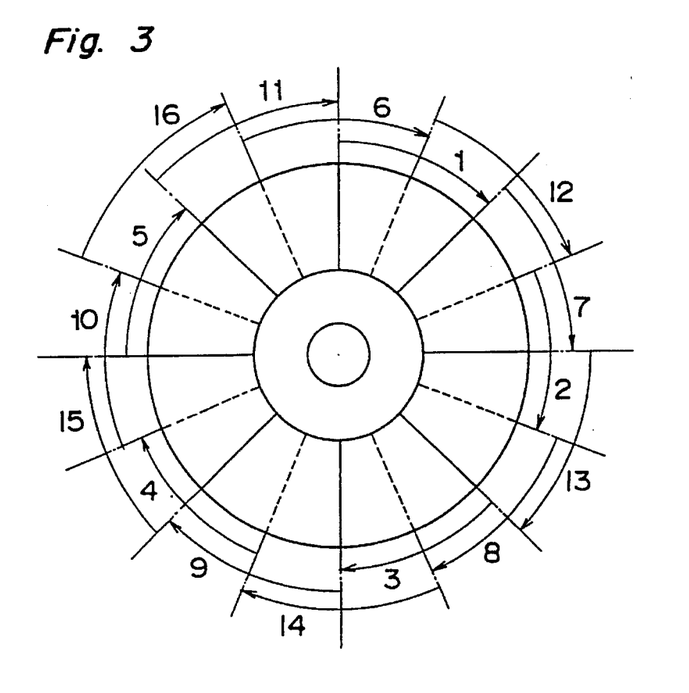
FIG. 3 is a schematic top plan view for explaining use of sectors for a first embodiment of the optical disk substrate according to the first embodiment of the present invention.

FIG. 3 shows an example for use of the sectors in the optical disk substrate for a first embodiment of the present invention.

Solid lines in the radial direction show the positions of addresses in the sectors on the front face, while dotted lines represent the positions of addresses in the reverse face, and the amount of deviation in the sectors between the front and reverse faces is set to be equivalent to ½ sector. In the above case, when the sectors on the front and reverse faces are accessed in the order as shown in FIG. 3, the waiting time required for the change-over between the front and reverse faces is to be the time for the disk to move through the amount equivalent to ½ sector. In the case where the addresses are in the same position on the front and reverse faces as in the conventional arrangement, time for the disk to move through the amount equivalent to one sector is required for the change-over between the front and reverse faces.

The purpose for disposing the pit rows of the addresses on the radial lines passing through the center of the substrate is to reduce the time required for the retrieval by specifying the position on the disk from the address information.

Subsequently, the reason why the tracks of the substrate are formed by the lands and grooves will be described.

In the tracking systems for the optical disk having the flat tracks, there is a sample servo system, in which pit row showing the positions of tracks are provided through a predetermined interval. Such pit rows are required to be provided at frequencies of 40 to 50 MHz for the tracking control, and formed as the sector in one set with the address information. In this case, if the sector positions are provided to be deviated between neighboring tracks, the influence of the pit row of the sector in the neighboring track acting as disturbance with respect to the tracking control is received in the frequencies at 40 to 50 MHz, and thus, the tracking becomes unstable. In other words, by effecting the tracking through utilization of the lands and grooves of the tracks, the number of pit row to be provided on one track can be reduced to a larger extent.

The substrate 1 as shown in FIGS. 1(a) to 1(c) is made of a resin such as PMMA (polymethal methacrylate), polycarbonate, polyolefin or the like, or a glass material. In the case of a resin material, the substrate may be formed by the injection compression molding method by using a metallic stamper of nickel or the like. Formation of concave and convex portions on the stamper may be effected, for example, by a method of employing two light beams having the same spot diameter. In the first place, on a polished glass original plate like a disk, a photoresist layer is formed in a uniform film thickness by using a spin coater, and baked. Then, two light beams having the same spot diameter and strength, with wavelength in the sensitizing band of the photoresist are projected onto the photoresist surface. These two light beams are disposed through a space equivalent to a distance between the neighboring tracks, in a direction at right angles with the displacing direction of the glass original plate. In this case, it is preferable that the two light beams should be spaced apart in the circumferential direction in order to avoid interference therebetween, and these two light beams are independently modulated through synchronization, so as to expose the photoresist. In such a manner, neighboring tracks provided with respect to the light beams different in the incident directions are simultaneously formed. At this time, in order to focus on the photoresist face, another light beam having a wavelength outside the sensitizing band of the photoresist is employed.

In the case where the tracks are provided in the concentric shape, after exposure of the amount for one circumference, the irradiating light source is mechanically displaced by an amount equivalent to two tracks of the land and groove. Meanwhile, when the tracks are to be spirally provided, mechanical feeding is effected at a constant feeding speed so that after displacement of one circumference, the track for the land comes to the position of the next track for the land, and the track for the groove, to the position of the next track for the groove, respectively. After the exposure, development of the photoresist is effected. In the case where the photoresist is of a positive type, the exposed portion is dissolved by an alkaline developing solution, while the portion not exposed remains as is. Thereafter, the glass original plate is washed and dried, and after a silver mirror finish is effected, it is subjected to nickel electro-plating for subsequent separation to form the stamper. Here, before the nickel electro-plating, sputter plating of nickel or non-electrolysis plating may be effected as in the generally known practice. Before attaching to the metal mold, the reverse face of the stamper is polished for smoothness and uniform thickness of the substrate to be molded.

In the case of a glass substrate, there are a sol-gel method on one hand, in which a material in a fluid state is poured into a metal mold for hardening by using the stamper as in the resin substrate, and another method by etching on the other hand. The etching method includes the steps of polishing a glass substrate of a flat disk, washing the glass substrate, applying a photoresist thereonto, spin coating thereof, subjecting the glass substrate to baking treatment, exposing to the laser beam, and after developing, effecting etching by using the photoresist remaining on the glass substrate as a mask. In the case of this method also, during the exposure by the laser beam, exposure may be effected by means similar to that in the stamper forming as described earlier, i.e., the means which employs the three light beams, one light beam with the wavelength outside the sensitizing band of the photoresist, and the others with the wavelength within the sensitizing band thereof.

Figure 4:
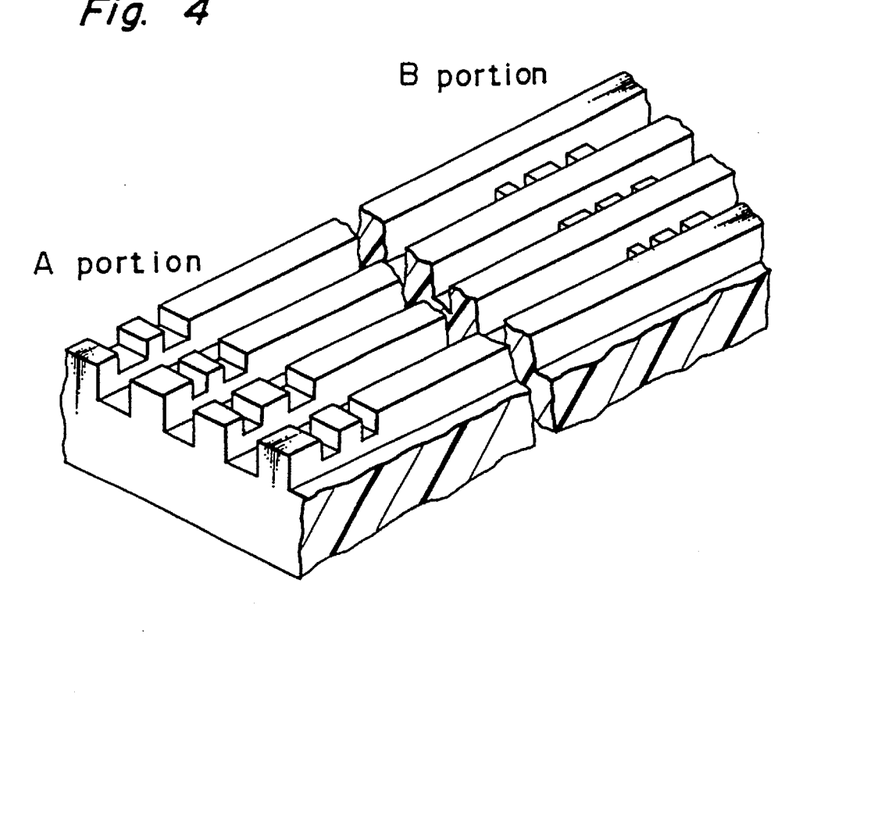
FIG. 4 is a fragmentary perspective view showing a second embodiment of an optical disk substrate of the present invention.

FIG. 4 shows address pit rows for a second embodiment of an optical disk substrate of the present invention. The tracks are provided by the lands and grooves so as to be in the concentric shape or spiral shape. In this substrate also, the positions of the address pit rows are spaced apart in the circumferential direction between the tracks forming the lands and the tracks forming the grooves as viewed from one face side. The positions of the address pit rows in the tracks forming the lands and those forming the grooves are arranged on the radial lines passing through the center of the substrate in the plurality of tracks. This arrangement is intended to access the desired position on the substrate at high speed, since the positions of the tracks and sectors are specified.

Meanwhile, for changing-over the access between the tracks provided on the front and reverse faces, the amount of deviation in the positions of the addresses of the tracks for the lands and grooves is required to be longer than the length of the address in order to read the address of the subsequent track after having read the address of the previous track. Specifically, such deviation amount of the addresses is in the range from ¼ sector to ¾ sector as described earlier, and more preferably, ½ sector. In the case of the double-sided disk for simultaneous access on the front and reverse faces, the waiting time necessary for the change-over of the access on the front and reverse faces becomes the deviation amount of the sectors. Accordingly, the waiting time may be made shorter than the conventional displacing time of the disk for one sector.

In the optical disk substrate of the second embodiment as described above also, the correspondence of the concave and convex portions of the pits for the addresses to the information is inverted between the track for the lands and the track for the grooves in the similar manner as in the first embodiment. The directions of the starting and the ending of the information are the same both in the A portion and B portion. This is owing to the fact that, for example, in the case where the irradiation light is projected onto the track of the address for A from the mirror face side of the substrate 1, and onto the track of the address for B from the opposite side, the correspondence of the address pits to the information becomes the same when observed from the irradiation light side, and therefore, one reading circuit of the addresses is sufficient for the purpose. It is needless to say that the arrangement may, for example, be so modified that the irradiation light from the mirror face side of the substrate 1 is projected onto the track of the address for B, and that from the opposite side is projected onto the track of the address for A.

Although the address pit rows act as the disturbance for the tracking control in this embodiment also, such address pit rows are spaced apart in the circumferential direction between the tracks for the lands and the tracks for the grooves in the similar manner as in the first embodiment, and the detecting frequency for the address is low, with a shorter time occupied by the address in the signal, and thus, the addresses can be read stably, without affecting the tracking performance.

The distinguishment between the tracks for the lands and the tracks for the grooves during the tracking may be readily effected by utilizing the tracking error signal and the single differential signal of the tracking error signal as described earlier with reference to the first embodiment. Since this identification method does not require one to read the address information, it may be processed in real time in the search or retrieving function for access to the arbitrary tracks and sectors.

According to the present invention, the pit rows of the address information are provided by the lands and grooves formed with a large level difference or by the concave and convex portions on the tracks for the lands and grooves. By such an arrangement, the influence due to the disturbance in the address pit rows is reduced. Therefore, the substrate of the present invention is effective even in the case of a ROM in which a data portion is also constituted by the pit rows.

The substrate of the present invention is made of a resin or a glass material. In the case of the resin material, the substrate is formed by the injection compression molding method by using a stamper. For the stamper, a photoresist layer is first formed in a uniform film thickness on a polished glass original plate like a disk by using a spin coater, and baked. Then, by applying focusing with a light beam having a wavelength outside the sensitizing band of the photoresist, continuous exposure is effected by a light beam with a wavelength within the sensitizing band of the photoresist, for subsequent development to form alternately continuous tracks for the lands and tracks for the grooves.

The pit rows are not first formed, since it is necessary to effect the tracking control by using the tracks for the lands and grooves in the next step.

Thereafter, the photoresist is again applied, and the photoresist layer is formed into a uniform film thickness by using a spin coater, and baked. This time, the tracks for the lands or the tracks for the grooves are subjected to the tracking control by the light beam with a wavelength outside the sensitizing band of the photoresist, together with focusing applied. Then, two light beams having the same spot diameter and strength, with wavelength in the sensitizing band of the photoresist are projected onto the photoresist surface. These two light beams are disposed through a space equivalent to the distance between the neighboring tracks in a direction at right angles with the displacing direction of the glass original plate. In this case, it is preferable that the two light beams should be spaced apart in the circumferential direction in order to avoid interference therebetween, and these two light beams are independently modulated through synchronization, so as to expose the photoresist for subsequent development. In such a manner, neighboring tracks provided with respect to the light beams different in the incident directions are simultaneously formed. As a result, on the tracks for the lands and grooves provided through a large difference in level as shown in FIG. 4 on the glass original plate, the address pit rows can be formed by concave and convex portions. Thereafter, the glass original plate is washed and dried, and after a silver mirror finish is effected, it is subjected to nickel electro-plating for subsequent separation to form the stamper. Here, before the nickel electro-plating, sputter plating of nickel or non-electrolysis plating may be effected as in the generally known practice. Before attaching to the metal mold, the stamper is polished at its reverse face for smoothness and uniform thickness of the substrate to be molded.

Meanwhile, in the case of the glass substrate, there are available the sol-gel method and the etching method as referred to earlier. The etching method includes the steps of polishing a glass substrate of a flat disk, washing the glass substrate, applying a photoresist thereonto, spin coating thereof, subjecting the glass substrate to baking treatment exposing to the laser beam, and after developing, effecting etching by using the photoresist remaining on the glass substrate as a mask. In the above case where the etching is effected, the step of forming the stamper and steps up to the developing of the photoresist are the same, and the step of forming the concave and convex portions on the glass original plate by etching is added thereafter. In the case of preparing the glass substrate also, the alternately continuous tracks for the lands and the grooves are first formed, and then, the concave and convex pits are formed in the tracks for the lands and grooves.

Subsequently, results of investigation made into the cross-talk by the neighboring tracks under such conditions that the width of the tracks for the lands and grooves is 0.8 μm, wavelength is 830 nm, and aperture number of an object lens is 0.5, will be described hereinbelow.

In the case where the information in the data region utilizes phase difference of light as in a ROM, the cross-talk with respect to the neighboring track was reduced below −30 dB, when the level difference between the track for the land and the track for the groove was larger than 200 nm. On the other hand, when the information in the data region utilizes the difference of the reflection of light in the data region, the cross-talk with respect to the neighboring track was reduced below −30 dB, when the level difference between the track for the land and the track for the groove was larger than 50 nm.

Figure 1:
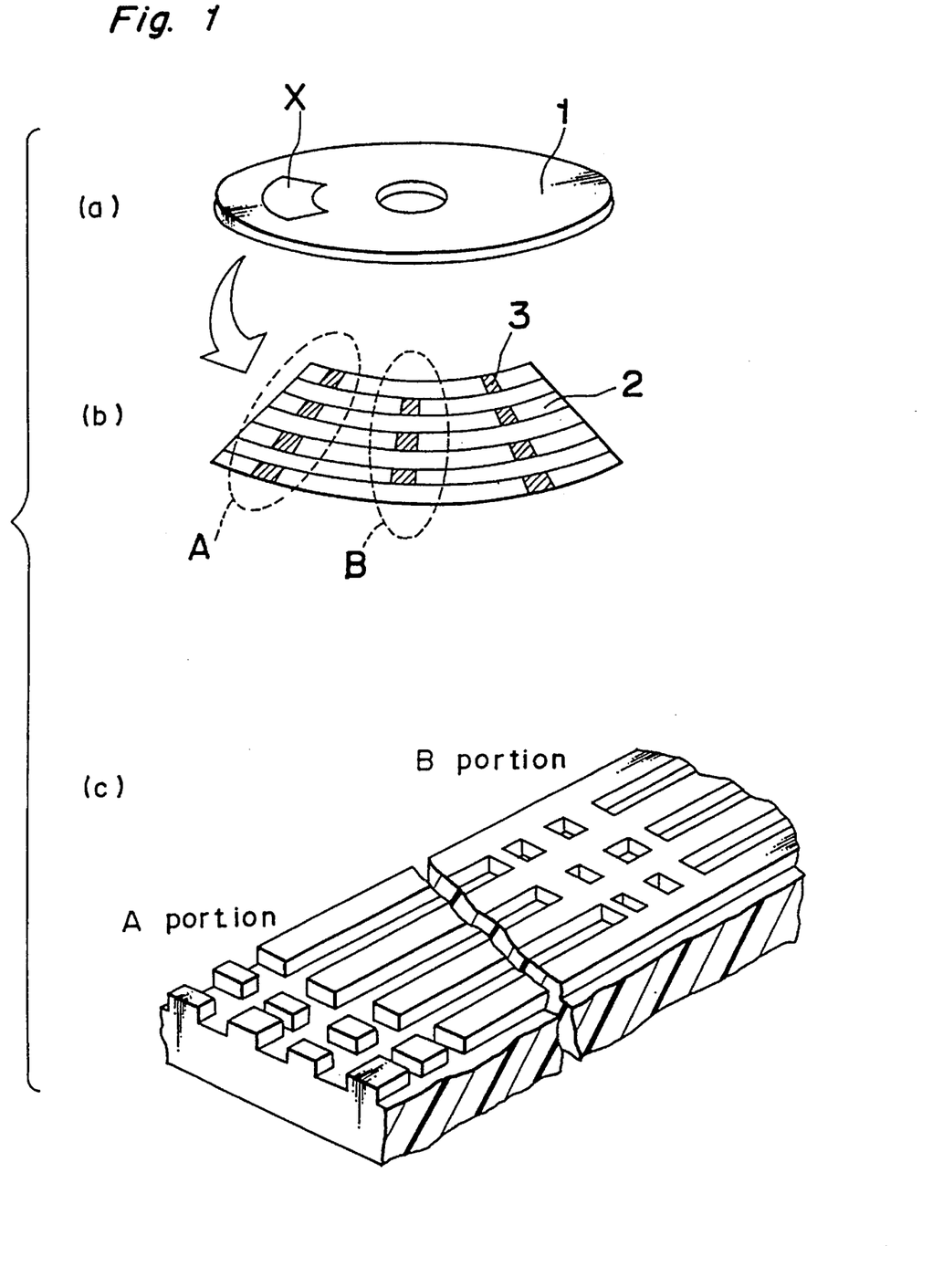
FIG. 1(a) is perspective view of an optical disk substrate according to one preferred embodiment of the present invention.
FIG. 1(b) is a fragmentary top plan view showing on an enlarged scale, a portion indicated by X on the surface of the disk in FIG. 1(a) for explaining construction of tracks and addresses thereof.
FIG. 1(c) is a fragmentary perspective view showing on a still enlarged scale, part of the tracks and addresses in FIG. 1(b)
Figure 5:
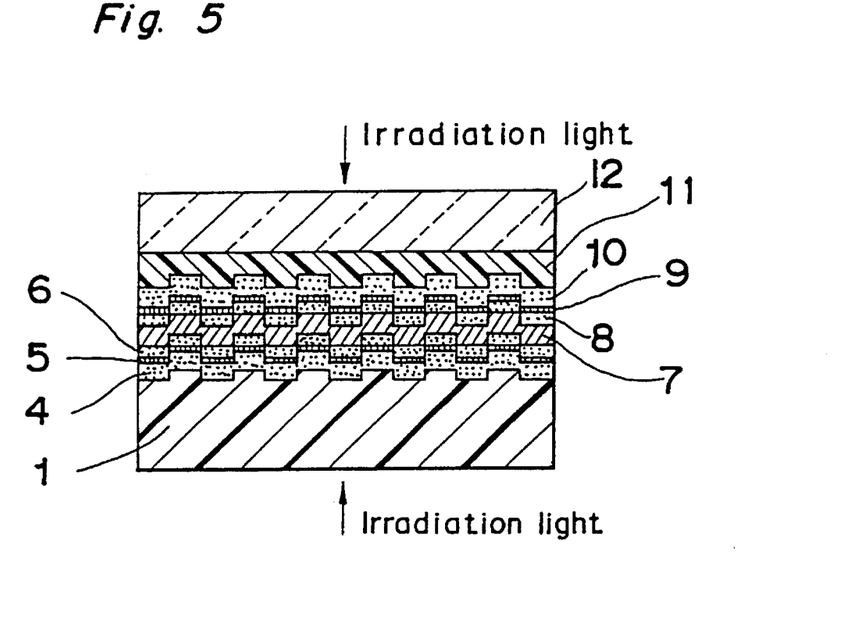
FIG. 5 is a fragmentary cross section showing on an enlarged scale, an optical disk according to a first embodiment of the present invention.

FIG. 5 shows a fragmentary cross-section of the optical disk according to a first embodiment of the present invention utilizing the disk substrate as illustrated in FIG. 1 or 4.

In FIG. 5, the optical disk includes a substrate 1, and a dielectric layer 4, an active layer 5, a dielectric layer 6, a reflective layer 7, a dielectric layer 8, an active layer 9, and a dielectric layer 10 sequentially laminated on the dielectric layer 4 in that order, on the substrate 1 by a vacuum film forming method, e.g., a sputtering method and a transparent flat plate 12 further applied onto the dielectric layer 10 through an adhesive layer 11, so as to provide a mirror symmetrical relationship at said reflective layer 7. As described above, since the optical disk according to the present embodiment may be formed only by the steps similar to those in the conventional single-sided optical disk, labor time during manufacture can be lowered for cost reduction.

For the active layers 5 and 9, for example, a dyeing material, a phase-change material, and an optical magnetic material, etc. are suitable. Since the active layers for 5 and 9 are optically cut off by the reflective layer 7, marks formed in the active layers 5 and 9 may be read without interference.

Meanwhile, according to the optical disk of the present invention, the mirror-symmetry is established at the reflective layer 7 with respect to the light irradiated onto the substrate 1, the processing of the signal system becomes the same on the both faces of the disk, and thus, the circuit system may be simplified.

Moreover, since the positions of the addresses 3 formed in the pits are spaced apart in the circumferential direction, there is no possibility that interference occurs during reading of the addresses. Particularly, when the amount of spacing of the addresses is set to be in the range of ¼ sector to ¾ sector, and preferably, at ½ sector, the waiting time for change-over between the front and reverse faces is shortened from the conventional displacing time of the disk for one sector during associated use of the front and reverse faces, and thus, high speed access is made possible.

It is to be noted that in the present embodiment (FIG. 5), although the flat plate 12 is employed for the surface at one side, this may of course be replaced by another substrate 1. Moreover, the dielectric layers 4 and 10 or dielectric layers 6 and 8 may be dispensed with depending on the requirement.

Figure 6:
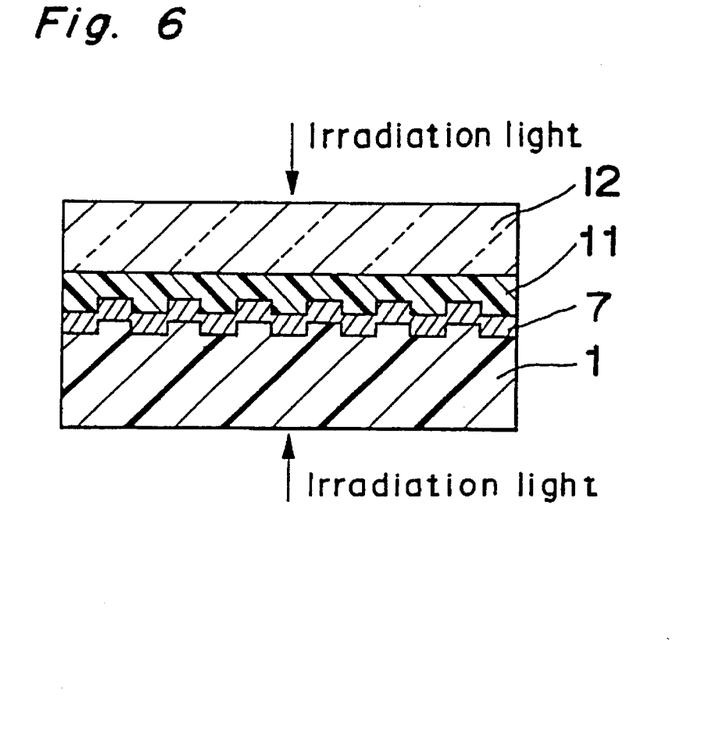
FIG. 6 is a fragmentary cross section showing on an enlarged scale, an optical disk according to a second embodiment of the present invention.

FIG. 6 is a fragmentary cross-section of an optical disk according to a second embodiment of the present invention, in which the disk substrate 1 as shown in FIG. 4 is employed.

In FIG. 6, the optical disk includes a substrate 1, and tracks for lands and grooves formed at approximately the same width on the substrate 1 in a concentric or spiral configuration. On the substrate 1, not only the addresses, but also information of data (i.e., ROM) are provided by the pits of a system in which correspondence of the concave and convex portions to the information is inverted respectively at the lands and grooves. Moreover, information pits such as track addresses and sector addresses, etc. are also provided at different positions in the circumferential direction in the lands and grooves. On the substrate 1, a reflective layer 7 is formed, and a transparent flat plate 12 is applied thereon through an adhesive layer 11. Here, the pits for the lands and grooves provided on the substrate 1 are required to be increased in the difference of heights between the lands and grooves so as to prevent optical interference therebetween. A level difference larger than 200 nm was necessary as a result of experiments under the conditions that the width of the track for the land and groove was 0.8 µm, wavelength of the irradiation light was 830 nm, and aperture number of the objective lens was 0.5.

When the optical disk is observed with respect to the irradiation light from the side of the substrate 1, and the irradiation light from the side of the flat disk 12, both are the same optically, and therefore, reproduction of information can be effected by the same signal processing circuit system.

Moreover, since the manufacturing process of the optical disk according to the present embodiment is similar to that of the conventional single-sided optical disk, labor time required therefore may be decreased for a cost reduction.

Furthermore, when the spaced apart amount in the circumferential direction of the addresses provided on the lands and grooves is set to be in the range of ¼ sector to ¾ sector, and more preferably, to ½ sector, the waiting time for change-over between the front and reverse faces is shortened from the conventional displacing time of the disk for one sector during associated use of the front and reverse faces, and thus, high speed access is made possible.

Although the flat plate 12 is employed for the surface at one side, this may of course be replaced by another substrate 1.

Figure 7:
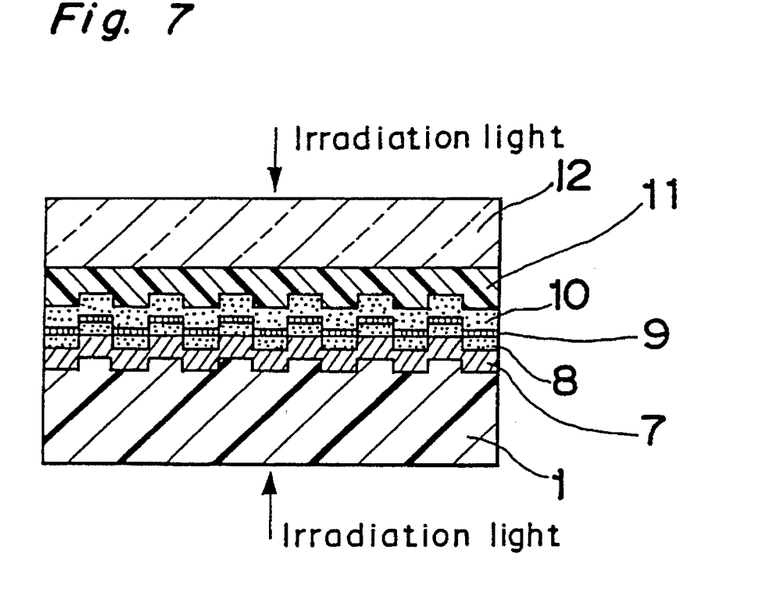
FIG. 7 is a fragmentary cross section showing on an enlarged scale, an optical disk according to a third embodiment of the present invention.

FIG. 7 is a fragmentary cross section of an optical disk according to a third embodiment of the present invention, in which the disk substrate 1 as shown in FIG. 4 is also employed.

In FIG. 7, the optical disk has a substrate 1, and tracks for lands and grooves formed at approximately the same width on the substrate 1 in a concentric or spiral configuration. On the substrate 1, information pits of data are provided on the track for the lands.

Moreover, information pits such as track addresses and sector addresses, etc. are provided at different positions in the circumferential direction in the lands and grooves. In these information pits, correspondence of the concave and convex portions to the information is inverted respectively at the lands and grooves. On the substrate 1, a reflective layer 7, a dielectric layer 8, an active layer 9 and a dielectric layer 10 are sequentially formed and a transparent flat plate 12 is applied thereon through an adhesive layer 11. Here, the pits for the lands and grooves provided on the substrate 1 are required to be increased in the difference of heights between the lands and grooves so as to prevent optical interference therebetween. A level difference larger than 200 nm was necessary as a result of experiments under the conditions that the width of the track for the land and groove was 0.8 µm, wavelength of the irradiation light was 830 nm, and aperture number of the objective lens was 0.5.

Here, the amount of the reflective light is utilized for the detection of the signal, and thus, it is desirable to make the recording mark and the pit optically equal. By such arrangement, the signal processing circuit for the reproduction may be reduced to one.

Moreover, since the manufacturing process of the optical disk according to the present embodiment is similar to that of the conventional single-sided optical disk, labor time, required therefore may be decreased for a cost reduction.

Furthermore, when the amount of spacing in the circumferential direction of the addresses provided on the lands and grooves is set to be in the range of ¼ sector to ¾ sector, and more preferably, to ½ sector, the waiting time for change-over between the front and reverse faces is shortened from the conventional displacing time of the disk for one sector during associated use of the front and reverse faces, and thus, high speed access is made possible.

It is to be noted that although the flat plate 12 is employed for the surface at one side, this may of course be replaced by another substrate 1, while the dielectric substrates 8 and 10 may be dispensed with.

It should also be noted here that the layers to be formed on the substrate 1 may be so modified that the dielectric layer, the active layer, the dielectric layer, and the reflective layer are formed on said substrate 1 in the order opposite to that in the embodiment of FIG. 7.

Additionally, in the above embodiment, although the information other than the address (data information, etc.) is formed only on the track for the lands, this may be modified to be formed on the track for the grooves alone.

In the foregoing, an explanation has been provided with respect to the optical disk substrate and the optical disk of the double-side face simultaneously access type according to the present invention.

Subsequently, the optical disk substrate and the optical disk of a single-side face access type is described.

In the first place, the optical disk substrate according to a third embodiment of the present invention will be explained, which is similar in appearance to the substrate 1 as shown in FIGS. 1(a) and 1(b).

Specifically, on the substrate 1, the tracks 2 for the servo purpose are formed by lands and grooves in the concentric- or spiral configuration. The widths of the tracks for the lands and grooves are set to be the same for making the size of signals equal. On the tracks 2, the addresses 3 written with the information of the tracks 2 and sectors are formed in the form of pits. In the optical disk substrate according to the present invention, these addresses 3 are provided on the tracks 2 for the lands and grooves. The difference of the single-sided optical disk substrate from the double-sided optical disk substrate resides in the arrangement of the pit rows for the addresses 3. According to the present embodiment, correspondence of the concave and convex portions of the pit rows to the information is the same at the A and B portions, with the direction of disposition at the starting and end of the information being also the same. As a result, since the signals from the address pit rows formed in the tracks for the lands and grooves become the same, reading of the address may be effected by one circuit. Moreover, the pit rows for the addresses are disposed on the radial lines passing through the center of the substrate. This arrangement has for its object to reduce the time required for the retrieval by calculating and specifying the positions on the disk from the address information.

In the case where the address pit row of the tracks for the lands and that of the tracks for the grooves are located approximately in the same position as in the conventional arrangement, the information of the address pits of the neighboring tracks leaks in as a crosstalk during reading the information of the address pits, thus making it impossible to read.

According to the present invention, however, since the positions of the address pit rows are spaced apart in the circumferential direction between the lands and grooves, the crosstalk may be alleviated so as to allow the address information to be read. As the result of investigation into the crosstalk, in the case where an active layer of a phase-change material was used on a polycarbonate substrate having the width of the tracks for the lands and grooves at 0.8 µm in an optical system with the wavelength of 830 nm, and aperture number of the objective lens of 0.5, the crosstalk from the neighboring track was less than −30 dB when the difference in height between the land and groove was larger than 50 nm.

Moreover, it has also been found that the length of time as the signal of the address pit row with respect to the maximum control frequency band for the tracking should be less than four times for making it possible to be controlled. For example, in the case where the maximum control frequency band for the tracking is 3 KHz, the time length may be less than 83 µs.

In the substrate according to the present invention, it is preferable that the amount of spacing in the circumferential direction, in the positions of the addresses of the tracks for the lands and grooves should be selected to be in the range of ¼ sector to ¾ sector, and more preferably, at ½ sector.

The relationship between the optical disk and the read/write head is the same as that shown in FIG. 12.

One example for change-over of the tracks between the lands and grooves is shown in FIG. 3.

In FIG. 3, the solid lines in the radial direction show the positions of addresses on the tracks for the lands, while the dotted lines represent the positions of addresses on the tracks for the grooves, and the amount of deviation of addresses between the tracks for the lands and grooves is set to be equivalent to ½ sector. Therefore, in the above case, the time required for the change-over between the tracks for the lands and grooves is to be the time for the disk to move through the amount equivalent to ½ sector, and thus, becomes shorter than the time for one sector in the conventional arrangement.

In the case where the change-over of the track is effected between the lands and grooves, since the address of the subsequent track is read after having read the address in the previous track, it is necessary that the deviation amount of the addresses between the tracks is set to be at least longer than the length of the address.

As described earlier, with reference to the double-sided disk substrate, the identification of the tracks for lands and grooves provided on the substrate may be effected by using the tracking error signal and the single differential signal of the tracking error signal. Fundamentally, it is to be distinguished whether the point is to zero crossing point rising at the right or the zero crossing point lowering at the right. Since reading of the address is not required for the identification of the lands and grooves, processing may be effected in real time.

Moreover, even in the case where the change-over between the tracks for the lands and the tracks for the grooves is to be effected by one read/write head, it can be made only by the change-over of polarity for the tracking. Therefore, such a change-over between the track for the lands and the track of the grooves located close to each other may be effected in the waiting time for the disk to move through ½ sector.

The substrate can be prepared in the method similar to that described earlier with reference to the double-sided disk substrate. The resin substrate is prepared by the injection compression molding method using the stamper, while the glass substrate may be produced by the sol-gel method or etching method.

In the optical disk for the single side access according to the first embodiment of the present invention, at lease an active layer is provided on the optical disk substrate as shown in FIGS. 1(a) to 1(c). In this case, the optical disk may be in the double-sided structure or the single-sided structure. As the result of investigation into the crosstalk, in the case where an active layer of a phase-change material was used on the substrate having the width of the tracks for the lands and grooves at 0.8 µm in an optical system with the wavelength of 830 nm, and aperture number of the objective lens of 0.5, the crosstalk from the neighboring track was less than −30 dB when the difference in height between the land and groove was larger than 50 nm.

In the optical disk of the present invention, the active layer is not limited to be of the phase-change material, but may be of a dyeing material, optical magnetic material or the like.

Moreover, in the optical disk of the present embodiment, since the difference in height between the land and the groove is small, even the drive using one read/write head may be employed without changing the position of focus between the land and groove.

In the substrate of the present embodiment, since the positions of the address pit rows of the tracks for the lands and grooves are spaced apart, the information of the addresses may be read although they are provided next to each other, and thus, a high density recording two times that in the case where only the tracks for the lands or the tracks for the grooves are employed, may be achieved.

By setting the spaced apart amount of the addresses between the tracks for the lands and the grooves to ½ sector, the time required for the change-over of the tracks is reduced from the time for moving through one sector in the conventional arrangement, to the time for moving through ½ sector.

Figure 8:
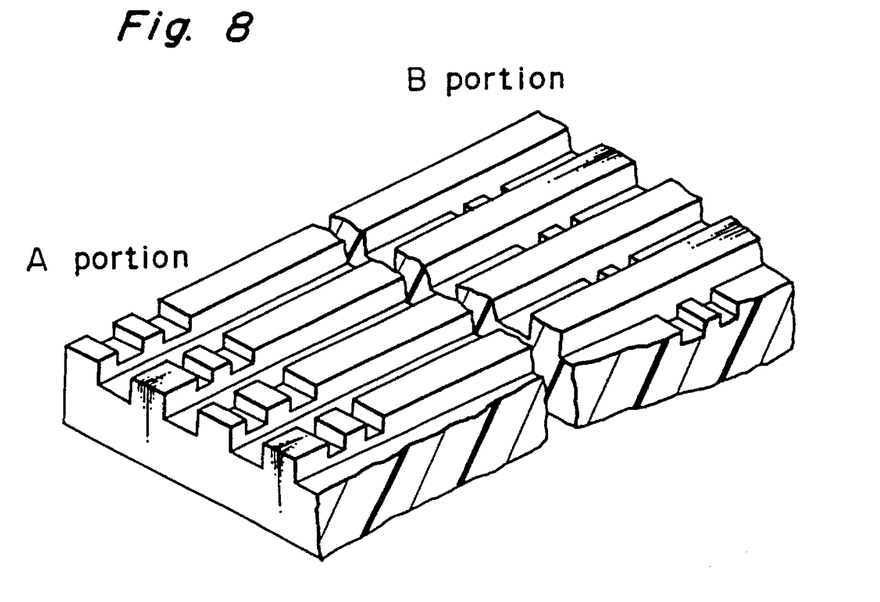
FIG. 8 is a fragmentary perspective view showing an optical disk substrate according to a fourth embodiment of the present invention.

Referring to FIG. 8, there is shown an optical disk substrate according to a fourth embodiment of the present invention.

In FIG. 8, on the substrate, the tracks for the servo purpose are formed by lands and grooves in the concentric or spiral configuration. The widths of the tracks for the lands and grooves are set to be the same for making the size of signals equal. On the tracks, the addresses written with the information of the tracks and sectors are formed in the form of pits. In the optical disk substrate according to the present invention, these addresses are provided on the tracks for the lands and grooves. The difference of the single-sided optical disk substrate from the double-sided optical disk substrate resides in the arrangement of the pit rows for the addresses. According to the present embodiment, correspondence of the concave and convex portions of the pit rows to the information is the same at the A and B portions, with the direction of disposition at the starting and end of the information being also the same. As a result, since the signals from the address pit rows formed on the tracks for the lands and grooves become the same, reading of the address may be effected by one circuit. Moreover, the pit rows for the addresses are disposed on the radial lines passing through the center of the substrate. This arrangement has for its object to reduce the time required for the search by calculating and specifying the positions on the disk from the address information.

According to the present embodiment, the addresses for the lands and grooves, are formed on the alternately continuous tracks for lands and grooves as the pit rows. In the case where the wavelength of the irradiation light is 830 nm, the aperture number of the objective lens is 0.5, and the width of the tracks at the land and groove is 0.8 µm, the difference in the height between the land and groove should be larger than 50 nm in the case where only the address portions are represented by the pits, and larger than 200 nm when the information recording utilizing pit row equiphase is effected for the data region also as in ROM, because the influence of the crosstalk of the information on the neighboring track is different, and in the recording utilizing the phase difference, the tracking control is also largely affected since the tracking of the tracks for the lands and grooves is effected through utilization of the phase difference.

Here, either one of the track for the land or the track for the groove may be made into ROM, and in this case, the difference in height between the land and the groove should be larger than 200 nm.

In the optical disk (single-sided high density disk) according to the second embodiment of the present invention, the optical disk substrate as shown in FIG. 5 is used, and at least an active layer is provided on said optical disk substrate.

In this embodiment, since the difference in the heights is provided between the neighboring tracks for the lands and grooves, the crosstalk by the information of the next track is reduced during reading of the information of the tracks for the lands and grooves, and stable reading of the information can be achieved. Moreover, since the neighboring tracks for the lands and grooves are utilized, the high density recording two times that in the case where only the tracks for the lands or the tracks for the grooves are read can be effected.

The amount of spacing of the address positions between the tracks for the lands and the tracks for the grooves should preferably be ¼ sector to ¾ sector, and more preferably, be ½ sector. When the amount of spacing is set to be ½ sector, the time required for the change-over of the tracks is reduced from the time required for the disk to move through 1 sector as in the conventional practice to the time for moving through ½ sector.

Meanwhile, for utilizing the optical disk of the present invention as a ROM disk, it may be so arranged to provide a reflective layer.

In the case of the substrate according to the present invention having data pits for ROM only on the tracks for the lands, or on the tracks for the grooves, or part of the tracks, an active layer at least capable of recording or rewriting is to be formed. By this arrangement, a disk having a ROM region and a recordable region or that having a ROM region and a rewritable region can be obtained.

The reason for forming the tracks by the plurality of sectors is, on one hand, to improve accuracy of the fundamental clock and synchronization for reduction of signal jitter during rewriting of marks and reproduction so as to obtain higher reliability during rewriting of information and reproduction, and on the other hand, to facilitate the access to any desired position on the disk by the address designation and address search or retrieval. The tracks are formed by the lands and grooves to effect the tracking. The widths of the lands and grooves are set to be generally equal to each other so as to make the size of the signals approximately equal to each other during formation of the marks on the lands and grooves.

According to the present invention, the pit rows having such information as the track address and sector addresses, etc. to be formed on the plurality of tracks for the lands, are disposed on approximately the same radial line passing through the center of the substrate, while the address pit rows of the tracks for the grooves between the lands are deviated in one direction on the same track and provided on approximately the same but different radial line passing through the center of the substrate. As a result, the reading is not affected by the pit rows of the neighboring track during reading of the information constituting of pit rows, and thus, the reading or the address is facilitated. Moreover, for change-over of the data between the tracks for the lands and grooves, the address pit row is to be encountered before moving through 1 sector, and the waiting time is reduced for making it possible to change-over of the data at higher speed than in the conventional arrangement. The reason for disposing the pit row of the addresses on the radial line passing through the center of the substrate is to specify the position on the disk by the address information for reduction of the time required for the retrieval.

Figure 9:
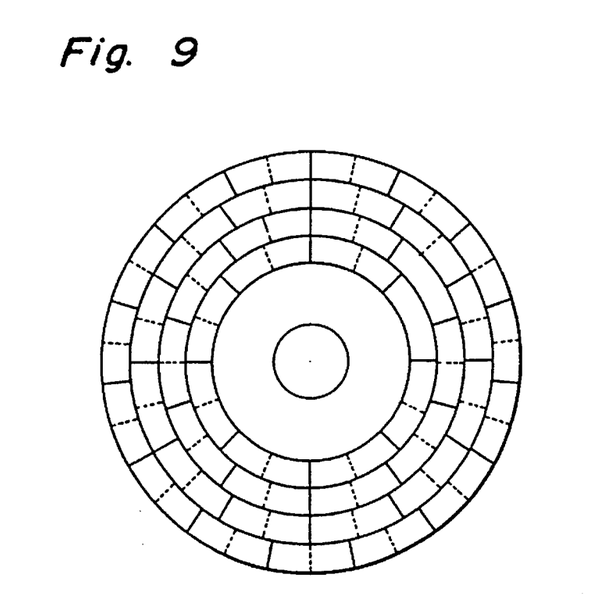
FIG. 9 is a schematic top plan view for explaining sectors of an optical disk substrate according to a fifth embodiment of the present invention.

In the substrate used for the present invention, both in the case of the double-sided disk and the single-sided disk, the positions where the address information pit rows on the tracks for the lands (solid lines) are present and the positions where the address information pit rows on the tracks for the grooves (dotted lines) are present, are arranged in the similar radial line shape from the inner circumference to the outer circumference of the substrate. However, it is not necessarily required to make the amount for the one circumference of the track into the same number of sectors from the inner circumference to the outer circumference as shown in FIG. 3. As shown in FIG. 9, it may be so arranged to divide the data region on the disk into a plurality of blocks from the inner circumference to the outer circumference, and to alter the number of sectors for one circumference of the track with the blocks. In this case, if the information in the sector is constant, the number of sectors can be increased towards the outer circumference, thereby to increase the recording capacity for the one substrate.

Moreover, the correspondence of the concave and convex portions and the information of the address pits provided on the lands and grooves is made the same in the case of the access system only at one side of the optical disk, and is inverted in the case of the double-side access. As a result, when the correspondence between the concave and convex portions and information of the address pits is observed from the incident direction of light, it becomes the same. Therefore, in this case, one circuit system is sufficient for reading the address pit information, and thus, the construction is simplified.

Furthermore, since the film formation corresponding to the front and reverse faces of the optical disk can be effected by one series of steps, labor time is decreased a cost reduction. By the employment of different neighboring tracks on the front and reverse faces of the optical disk, there is no possibility of heat interference, and recording and erasing of the marks, etc. may be stably effected.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical disk substrate comprising:

a plurality of sectors;

tracks alternately formed into lands and grooves in a direction intersecting at right angles with a tracing direction during recording or reproducing of information;

first address information regions formed with pit rows on a first track on a land; and second address information regions formed with pit rows on a second track in a groove neighboring said first track;

wherein each of said first and second address information regions having opposite edges, and wherein said first and second address regions are disposed so as to have no overlapping relationship therebetween such that edges of said first address regions are spaced from edges of said second address regions.

2. An optical disk substrate as claimed in claim 1, wherein correspondence between the address information and concave and convex portions of said pit rows is inverted between said neighboring tracks.

3. An optical disk which comprises an optical disk substrate comprising:

a plurality of sectors;

tracks alternately formed into lands and grooves in a direction intersecting at right angles with a tracing direction during recording or reproducing of information;

first address information regions formed with pit rows on a first track on a land; and second address information regions formed with pit rows on a second track in a groove neighboring said first track;

wherein each of said first and second address information regions having opposite edges, and wherein said first and second address regions are disposed so as to have no overlapping relationship therebetween such that edges of said first address regions are spaced from edges of said second address regions;

further comprising at least one active layer disposed on said optical disk substrate.

4. An optical disk which comprises an optical disk substrate comprising:

a plurality of sectors;

tracks alternately formed into lands and grooves in a direction intersecting at right angles with a tracing direction during recording or reproducing of information;

first address information regions formed with pit rows on a first track on a land; and second address information regions formed with pit rows on a second track in a groove neighboring said first track;

wherein each of said first and second address information regions having opposite edges, and wherein said first and second address regions are disposed so as to have no overlapping relationship therebetween such that edges of said first address regions are spaced from edges of said second address regions;

wherein correspondence between the address information and concave and convex portions of said pit rows is inverted between said neighboring tracks;

further comprising at least two active layers and a reflective layer disposed between said active layers.

* * * * *